US008113312B2

(12) United States Patent
Seki et al.

(10) Patent No.: US 8,113,312 B2
(45) Date of Patent: Feb. 14, 2012

(54) EVAPORATIVE EMISSIONS CANISTER ARRANGEMENT FOR A MOTORCYCLE, AND MOTORCYCLE INCORPORATING SAME

(75) Inventors: Hiroyuki Seki, Saitama (JP); Jun Nakano, Saitama (JP); Mitsuru Terada, Saitama (JP); Tatsuro Kato, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 46 days.

(21) Appl. No.: 12/832,302

(22) Filed: Jul. 8, 2010

(65) Prior Publication Data

US 2011/0024214 A1   Feb. 3, 2011

(30) Foreign Application Priority Data

Jul. 31, 2009   (JP) ................................. 2009-180196

(51) Int. Cl.
*B60K 15/01* (2006.01)

(52) U.S. Cl. ......... 180/225; 180/216; 180/218; 180/219

(58) Field of Classification Search ................. 180/69.4, 180/218, 219, 68.4, 68.5, 225; 123/519, 123/516, 518
See application file for complete search history.

(56) References Cited

U.S. PATENT DOCUMENTS

| 7,490,805 | B2 * | 2/2009 | Krall .......................... 248/311.2 |
| 2007/0186904 | A1 * | 8/2007 | Braithwaite et al. .......... 123/434 |
| 2010/0051369 | A1 * | 3/2010 | Kuramochi et al. ......... 180/69.4 |
| 2010/0163328 | A1 * | 7/2010 | Hasegawa ..................... 180/225 |
| 2010/0206653 | A1 * | 8/2010 | Koike ........................... 180/225 |

FOREIGN PATENT DOCUMENTS

JP   06-340281   12/1994

* cited by examiner

*Primary Examiner* — J. Allen Shriver, II
*Assistant Examiner* — James Triggs
(74) *Attorney, Agent, or Firm* — Carrier Blackman & Associates, P.C.; William D. Blackman; Joseph P. Carrier

(57) ABSTRACT

An evaporated fuel vapor from a fuel tank is fed through a charging pipe into an evaporated fuel storage canister, and is reserved there. The charging pipe, an upstream end of which is disposed in the fuel tank, is set to penetrate a side wall of the fuel tank and extends from the inside to the outside of the fuel tank. The canister is disposed in a swell-shaped recess on the inside of the front cowl, which recessed portion is situated between the headlight and the fuel tank as seen in side view.

19 Claims, 12 Drawing Sheets

EVAPORATIVE EMISSIONS CANISTER ARRANGEMENT FOR A MOTORCYCLE, AND MOTORCYCLE INCORPORATING SAME

CROSS-REFERENCE TO RELATED APPLICATIONS

The present invention claims priority under 35 USC 119 based on Japanese patent application No. 2009-180196, filed on Jul. 31, 2009. The entire subject matter of this priority document, including specification claims and drawings, is incorporated by reference herein.

BACKGROUND OF THE INVENTION

1. Technical Field of the Invention

The present invention relates to an evaporated fuel treatment device for a motorcycle having a canister for reserving an evaporated fuel generated in a fuel tank.

2. Background Art

In automobiles and motorcycles, part of a fuel such as gasoline reserved in a fuel tank is evaporated to be an evaporated fuel. Devices for reusing the evaporated fuel without releasing it into the outside air are known as evaporated fuel treatment devices.

As one of such evaporated fuel treatment devices which is for use on motorcycles, there a structure has been disclosed in which a canister is provided on a vehicle body (refer to, for example, Japanese Laid-open Patent Document No. Hei 6-340281.

In the case where a canister is disposed on a motorcycle which has little space therein, however, the degree of freedom in layout is limited. In addition, while the charging-purging performance of the canister is heavily influenced by the outside air temperature, motorcycles are small in size and are liable to be exposed to the outside air.

SUMMARY OF THE INVENTION

The present invention has been made in consideration of the above-mentioned circumstances. Accordingly, it is an object of the present invention to provide an evaporated fuel treatment device for a motorcycle which is enhanced in the degree of freedom in layout and on which the influence of the outside air temperature is lessened.

In order to solve the above-mentioned problem, According to the illustrative embodiment of the present invention, there is provided an evaporated fuel treatment device for a motorcycle including a fuel tank and a headlight which are disposed on a vehicle body frame, and front cowls each of which covers a lateral side of a front portion of a vehicle body and has a swell-shaped protuberant portion protuberant in a vehicle width direction, characterized in that a canister for reserving an evaporated fuel coming from the fuel tank is disposed between the headlight and the fuel tank in side view and in a swell-shaped recess on the inside of the front cowl.

According to the invention, the canister is disposed inside the swell-shaped recess on the inside of the front cowl, whereby the degree of freedom in layout of the vehicle body can be enhanced and a dead space between the headlight and the fuel tank can be utilized effectively. In addition, by covering the canister with the front cowl, it is possible to protect the canister, to restrain external heat arising from direct sunlight, exhaust heat, running airflow, etc. from being transmitted to the canister, and thereby to secure good charging-purging performance of the canister.

In addition, in the above-mentioned configuration, the canister may be disposed in a space surrounded by an instrument housing, which covers a meter and extends toward the inside of the front cowl, and the front cowl. This configuration ensures that the transfer of external heat to the canister is restrained more assuredly, so that the charging-purging performance can be enhanced more.

Also, in the above-mentioned configuration, the canister may be accommodated in the swell-shaped recess in the state of being covered by the instrument housing or/and the front cowl on the front and rear sides thereof. This configuration ensures that direct impingement of the running air flow on the canister with the result of cooling of the canister is prevented, whereby the purging efficiency can be prevented from being lowered.

Further, in the above-mentioned configuration, the canister may be supported on a cowl stay which is mounted to the vehicle body frame, and which also supports a cowl. This configuration permits the cowl stay to also be used as a canister stay for supporting the canister, so that the number of component parts can be thereby reduced.

In addition, in the above-mentioned configuration, a structure may be adopted in which a charging pipe interconnecting the fuel tank and the canister, a purging pipe interconnecting the canister and an intake system component of an internal combustion engine, and a purge control valve which is provided at an intermediate portion of the purging pipe and performs a duty control such as to control the quantity of the evaporated fuel sent to the internal combustion engine, are provided, and in which the charging pipe and the purging pipe are each supported by a respective clamp provided on the front cowl or the instrument housing, and the purge control valve is mounted to the front cowl or the instrument housing. This structure makes it possible to simplify clamps and a purge control valve mounting stay, and thereby to reduce the number of component parts.

Also, in the above-mentioned configuration, the charging pipe may penetrate a side surface of the fuel tank and extends from the inside to the outside of the fuel tank, and an area of the penetration may be covered by the front cowl. According to this configuration, the degree of freedom in layout can be enhanced, as compared with that in a configuration wherein the charging pipe is led out to the outside of the fuel tank through the lower side or the upper side of the fuel tank. In addition, covering of the area of the penetration by the front cowl promises both protection of the penetration area and enhanced appearance.

Further, in the above-mentioned configuration, the instrument housing and the front cowl may cover the canister on the upper side of the canister and may be opened to the lower side. This configuration ensures that direct sunlight can be shielded so as to earn a charging amount in the canister and that the heat of a radiator during running can be guided to the canister so as to promote the purging performance.

In addition, in the above-mentioned configuration, the canister may be disposed on the inner side, in the vehicle width direction, relative to a plane on which a grounding point of a front wheel and an end portion of a handlebar are located. This configuration ensures that in the case where an external force is about to act on the vehicle body from a lateral side and on a plane basis, the external force will act on the end portion of the handlebar or on the front wheel, before acting on the canister, so that the external force is restrained from acting on the canister.

Also, in the above-mentioned configuration, the front cowl may have a V-shaped side-view shape including an upper front cowl portion extending rearwards and a lower front cowl portion extending rearwardly downwards from a front lower portion of the upper front cowl portion, and the canister may be disposed on the inside of the upper front cowl portion. This configuration ensures that the front cowl is high in rigidity and that the heat from the radiator during running and the exhaust heat from the operating engine during when the motorcycle is at a stop are liable to be accumulated on the inside of the upper front cowl portion, so that it is possible to efficiently warm the canister while appropriately covering the canister.

According to the illustrative embodiment of the present invention, the canister is disposed between the headlight and the fuel tank, in side view, and in the swell-shaped recess on the inside of the front cowl. Therefore, the dead space between the headlight and the fuel tank can be utilized effectively, and the degree of freedom in layout can be enhanced. In addition, the canister can be protected from external forces by the front cowl. Further, the influence of external heat arising from direct sunlight and the like can be reduced, whereby good charging-purging performance of the canister can be secured.

Also, where the canister is disposed in the space surrounded by the instrument housing and the front cowl, transfer of external heat to the canister can be restrained, thereby further enhancing the charging-purging performance.

In addition, where the canister is accommodated in the swell-shaped recess in the state of being covered by the instrument housing or/and the front cowl on the front and rear sides thereof, direct impingement of a running airflow on the canister with the result of cooling of the canister can be prevented, whereby the purging efficiency can be prevented from being lowered.

Furthermore, where the canister is supported by a cowl stay for supporting the cowl, the need for a stay used exclusively for supporting the canister is eliminated.

In addition, where the charging pipe and the purging pipe are each supported by a respective clamp provided on the front cowl or the instrument housing and the purge control valve is mounted to the front cowl or the instrument housing, clamps and a purge control valve mounting stay can be simplified, and the number of component parts can be reduced.

Also, where the charging pipe penetrates the side surface of the fuel tank and the area of the penetration is covered by front cowl, the degree of freedom in layout can be enhanced, as compared with that in the configuration wherein the charging pipe is led out of the fuel tank through the lower side or the upper side of the fuel tank. In addition, the area of the penetration can be protected by the front cowl and the appearance thereof can be enhanced.

Also, where the instrument housing and the front cowl are set to cover the canister on the upper side of the canister and to be opened to the lower side, direct sunlight can be shielded to thereby earn a charging amount in the canister, and the heat from the radiator during running can be guided to the canister to thereby promote the purging performance.

Further, with the canister disposed on the inner side in the vehicle width direction relative to a plane on which the grounding point of the front wheel and an end portion of the handlebar are located, it is ensured that in the case where an external force is about to be exerted on a plane basis from a lateral side of the vehicle body, the external force will act on the end portion of the handlebar or on the front wheel, before acting on the canister, so that exertion of the external force on the canister is restrained.

In addition, where the front cowl has a V-shaped side-view shape including an upper front cowl portion which extends rearwards and a lower front cowl portion which extends rearwardly downwards from a front lower portion of the upper front cowl portion and the canister is disposed on the inside of the upper front cowl portion, it is possible to warm the canister efficiently while appropriately covering the canister.

For a more complete understanding of the present invention, the reader is referred to the following detailed description section, which should be read in conjunction with the accompanying drawings. Throughout the following detailed description and in the drawings, like numbers refer to like parts.

BRIEF DESCRIPTION OF THE DRAWINGS

FIG. 5 is a top plan view of a fuel tank supported on a vehicle body frame, cowl stays and the like.

DETAILED DESCRIPTION OF ILLUSTRATIVE EMBODIMENTS

Figure 1:
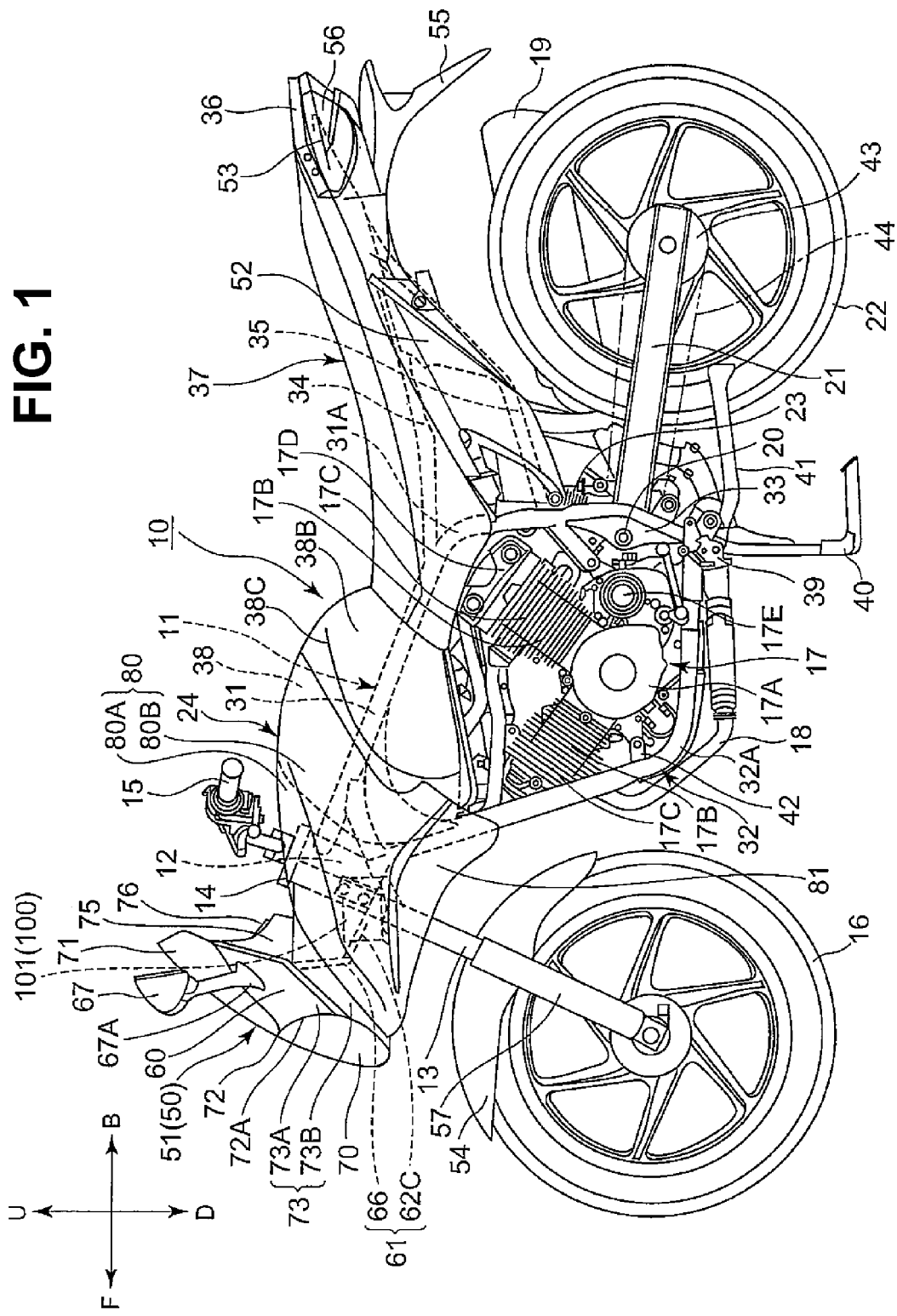
FIG. 1 is a side view of a motorcycle which includes an evaporated fuel treatment device according to an embodiment of the present invention.

Now, an illustrative embodiment of the present invention will be described below, referring to the accompanying drawings. In the following description, the directions such as forward, rearward, leftward, rightward, upward and downward are directions with respect to the vehicle body. Also, in the drawings, the front side of the vehicle body will be indicated by arrow F, the back (rear) side by arrow B, the left side by arrow L, the right side by arrow R, the upper side by arrow U, and the downward (lower) side by arrow D, suitably. Incidentally, the left-right direction will be appropriately referred to as "vehicle width direction."

Figure 2:
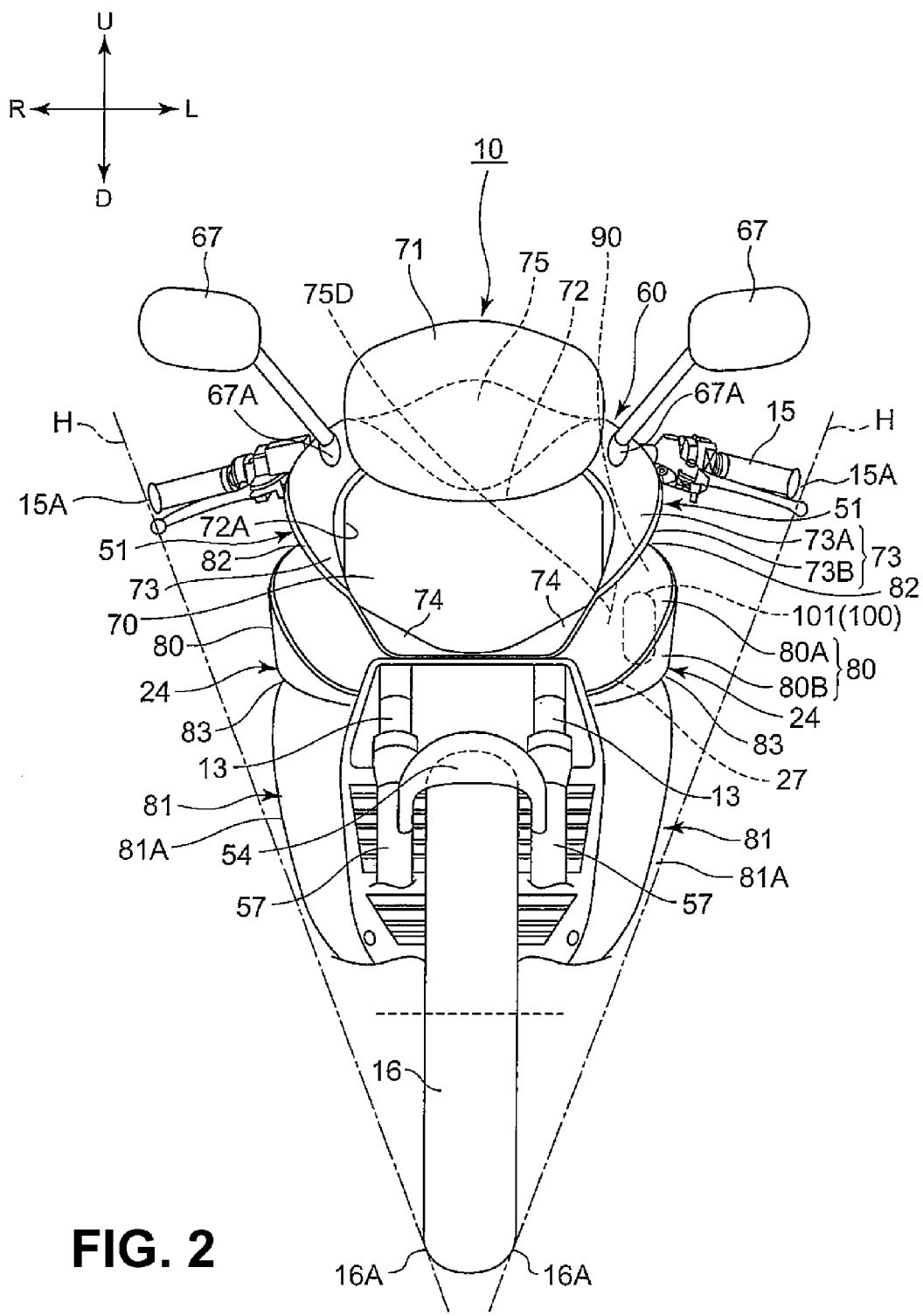
FIG. 2 is a front view of the motorcycle.

FIG. 1 is a side view of a motorcycle equipped with an evaporated fuel treatment device according to an embodiment of the present invention, and FIG. 2 is a front view of the same.

As shown in FIG. 1, the motorcycle 10 includes: a vehicle body frame 11; a left-right pair of front forks 13, 13 (in FIG. 1, only the front fork 13 on the left side is shown) turnably supported by a head pipe 12 mounted to a front end portion of the vehicle body frame 11; a steering handlebar 15 mounted to a top bridge 14 which supports upper end portions of the front forks 13, 13; a front wheel 16 rotatably supported on lower end portions of the front forks 13, 13; an engine 17 supported on the vehicle body frame 11; an exhaust muffler 19 linked to the engine 17 through an exhaust pipe 18; a rear swing arm 21 vertically swingably supported by a pivot 20 disposed at a rear lower portion of the vehicle body frame 11; a rear wheel 22 rotatably supported on a rear end portion of the rear swing arm 21; and a rear cushion 23 interposed between the rear swing arm 21 and the vehicle body frame 11. Further, the motorcycle 10 has front cowls (side cowls) 24, which covers both sides of a front portion of the vehicle body.

Figure 3:
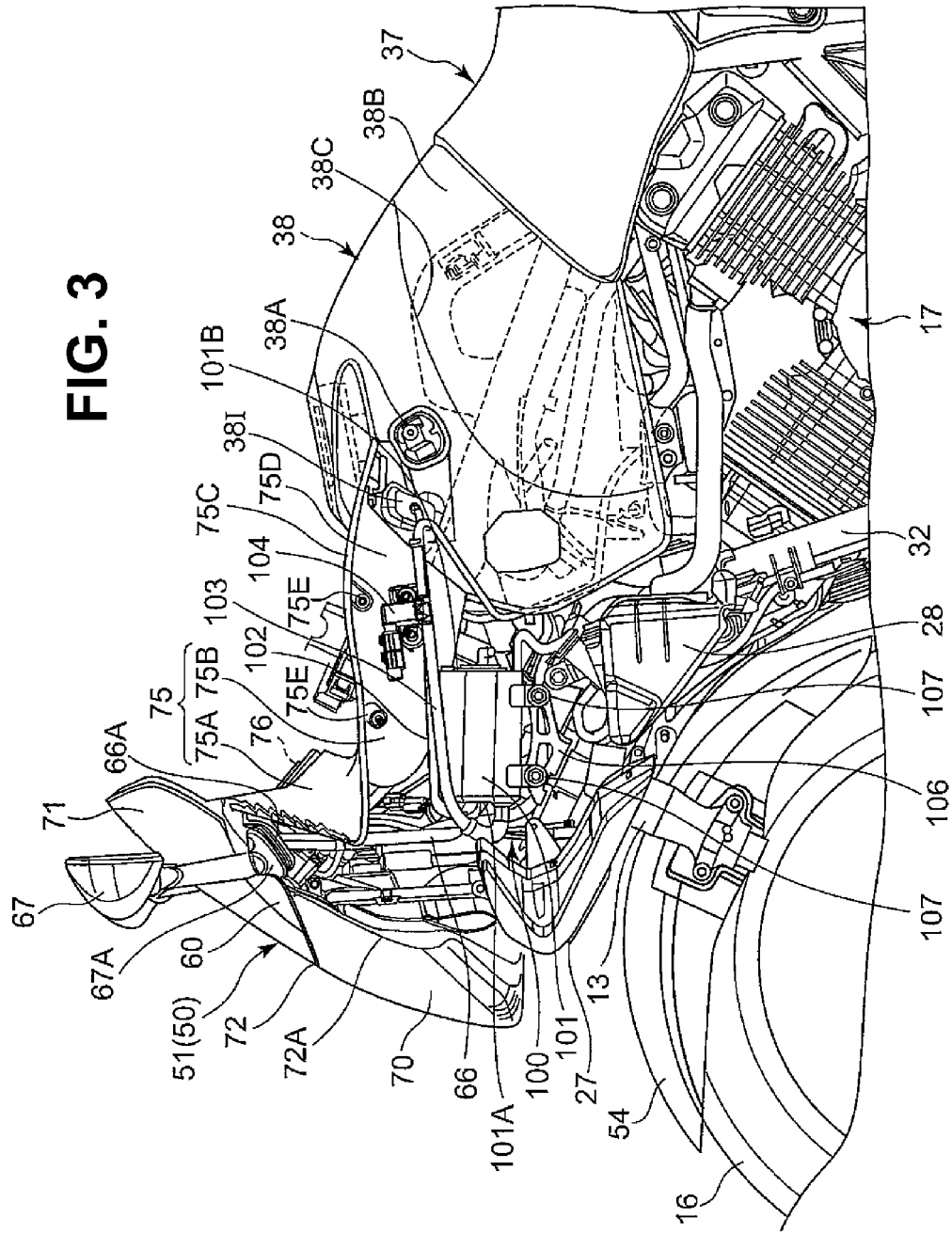
FIG. 3 is an enlarged left side view of a vehicle body front portion in the condition where a front cowl is removed.
Figure 4:
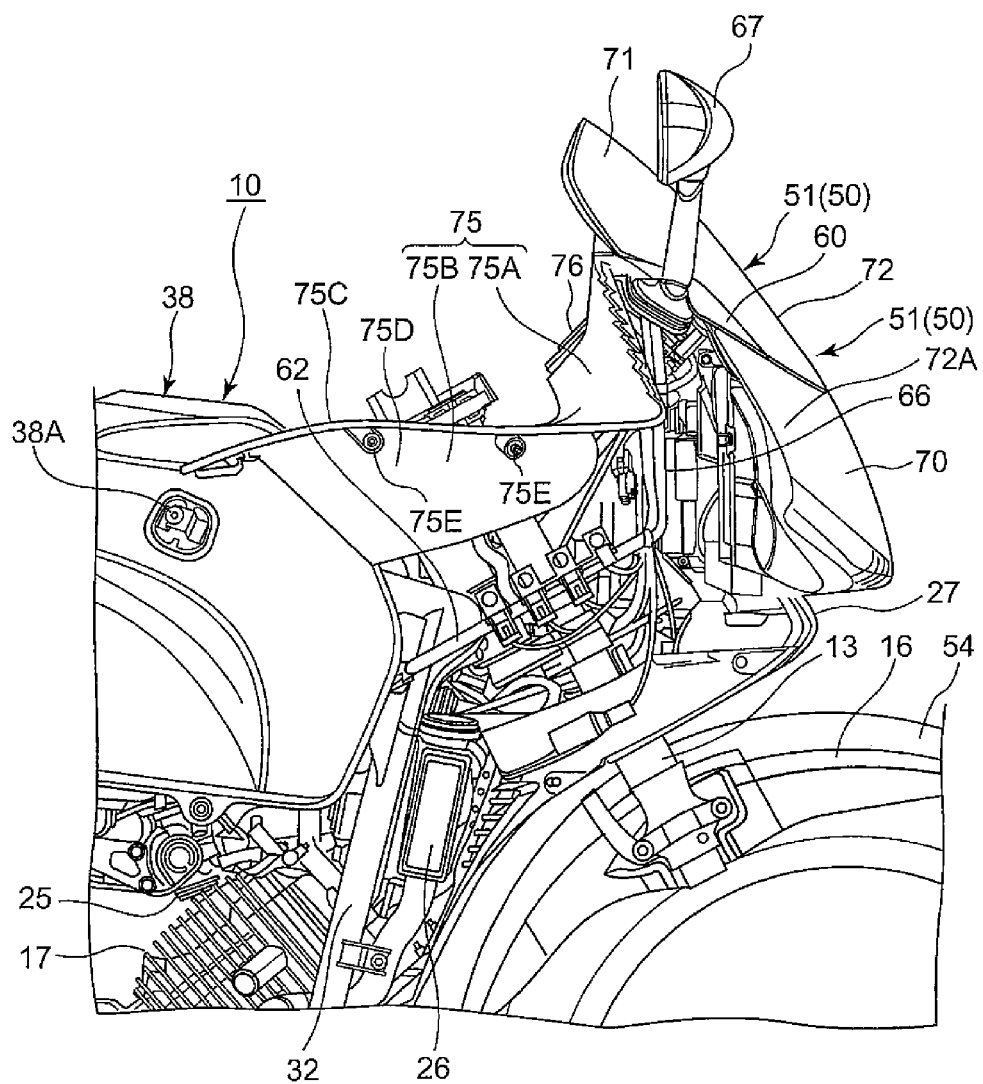
FIG. 4 is an enlarged right side view of the vehicle body front portion in the condition where a front cowl is removed.

FIG. 3 is an enlarged left side view of a front portion of the vehicle body in the condition where the front cowl 24 is removed, and FIG. 4 is an enlarged right side view of the front portion of the vehicle body in the condition where the front cowl 24 is removed.

As shown in FIG. 4, the motorcycle 10 has a carburetor 25 and a radiator 26. Further, as shown in FIGS. 1, 2 and 3, a canister 101 constituting a part of an evaporated fuel treatment device 100 is provided on the left side of a front portion of the vehicle body.

As shown in FIG. 1, the vehicle body frame 11 includes: a main frame 31 which extends rearwards while gently sloping down from the head pipe 12 and then extends substantially downwards by way of a curved portion 31A; and down tubes 32 each of which extends angularly rearwardly downwards on the lower side of the main frame 31 and then extends rearwards substantially horizontally by way of a curved portion 32A. Pivot plates 33 are disposed at the lower end of the main frame 31, and the pivot 20 for swingably supporting the rear swing arm 21 is provided at the pivot plates 33.

In addition, seat rails 34 extending rearwards are linked to the curved portion 31A of the main frame 31. The seat rails 34 are gently inclined rearwardly upwards, and are reinforced with stays 35 extending angularly rearwardly upwards from the pivot plates 33. A grab rail 36 to be gripped by a pillion passenger is disposed on the upper side of the rear end side of the seat rails 34. Also, a seat 37 on which a rider and the pillion passenger are to be seated is supported on the seat rails 34. A fuel tank 38 is supported on the front side of the seat 37, specifically, on that part of the main frame 31 which is located between the head pipe 12 and the curved portion 31A. Incidentally, the fuel tank 38 will be suitably described later. In the vicinity of the lower ends of the pivot plates 33, foldable steps 39 on which to put the feet of the rider in the seated state are mounted, and a main stand 40 and a side stand 41 are swingably mounted. In FIG. 1, the main stand 40 is in its use position, whereas the side stand 41 is in its non-use position.

The engine 27 is disposed on the lower side of the fuel tank 38, specifically, in a space surrounded by the main frame 31 and the down tubes 32. Incidentally, the engine 17 shown in the drawings is an air-cooled V-type two-cylinder engine. The engine 17 is supported by the down tubes 32 through engine mounts 42. The engine 17 includes: a crankcase 17A supported on the above-mentioned pivot plates 33; cylinder blocks 17B, 17B connected respectively to a front upper portion and a rear upper portion of the crankcase 17A; cylinder heads 17C, 17C connected respectively to upper portions of the cylinder blocks 17B, 17B; and head covers 17D, 17D connected respectively to upper portions of the cylinder heads 17C, 17C.

The cylinder block 17B and the cylinder head 17C are provided with cooling fins at the peripheries thereof. A piston is reciprocatably accommodated in a cylinder in the cylinder block 17B. A crankshaft connected to the piston through a connecting rod and an engine output shaft 17E are rotatably borne inside the crankcase 17A (in FIG. 1, that portion of a crankcase cover which corresponds to the engine output shaft 17E is shown). In addition, a clutch mechanism constituting a power transmission mechanism between the crankshaft and the engine output shaft, a transmission and the like are accommodated in the crankcase 17A. A drive chain 44 (indicated by two-dotted chain line in FIG. 1) is wrapped around a sprocket which is mounted to the engine output shaft 17E and a sprocket 43 which is mounted to the rear wheel 22, and the rotation of the engine 17 is transmitted to the rear wheel 22 through the power transmission mechanism and the like.

An exhaust pipe 18 is connected to the cylinder heads 17C, 17C, and an air cleaner and a carburetor 25 (see FIG. 4) are disposed in the vicinity of the cylinder heads 17C, 17C. The carburetor 25 is supplied with a fuel from the fuel tank 38, and a mixture of the fuel with air fed from the air cleaner is supplied from the carburetor 25 to the engine 17. Incidentally, an injection system may be adopted in place of the carburetor system.

As shown in FIG. 1, the motorcycle 10 configured as above is provided with various vehicle body covers 50 for covering the vehicle body. The vehicle body covers 50 include a front cowl (cowl) 51 for covering a front portion of the vehicle body (The front cowl 51 will be described in detail later), a left-right pair of side covers 52, 52 (only the side cover 52 on the left side is shown in FIG. 1) for covering side portions of the vehicle body, and a rear seat cowl 53 for covering a rear portion of the vehicle body. Furthermore, a front fender 54 for covering the front wheel 16 and a rear fender 55 for covering the rear wheel are also provided.

In side view, the side cover 52 is disposed on the lower side of the seat 37 and on the rear side of the engine 17. Specifically, the side cover 52 is so disposed as to extend from a substantially central portion in the front-rear direction of the seat 37 to the rear side of the seat, so as to cover a space between the lower end edge of the seat 37 and the stay 35.

The rear seat cowl 53 is fixed on the rear end side of the seat rails 34. The rear seat cowl 53 is also connected to the rear ends of the side covers 52, is extended rearwards, and covers rear portions of the seat rails 34. Rear turn-signal lamps 56 are integrally incorporated in the rear seat cowl 53.

The front fender 54 is secured to outer tubes 57 of the front forks 13, 13, and covers the front wheel 16 on the upper side of the latter.

The rear fender 55 is attached to the lower side of rear portions of the seat rails 34, and covers the rear wheel 22 on the upper side of the latter.

As shown in FIGS. 1 and 2, the front cowl 51 include a front upper cowl portion 60 for covering a front central portion of the vehicle body, and a left-right pair of front cowl portions 24, 24 provided on lateral sides of the front upper cowl 60 so as to cover front lateral portions of the vehicle body.

Figure 5:
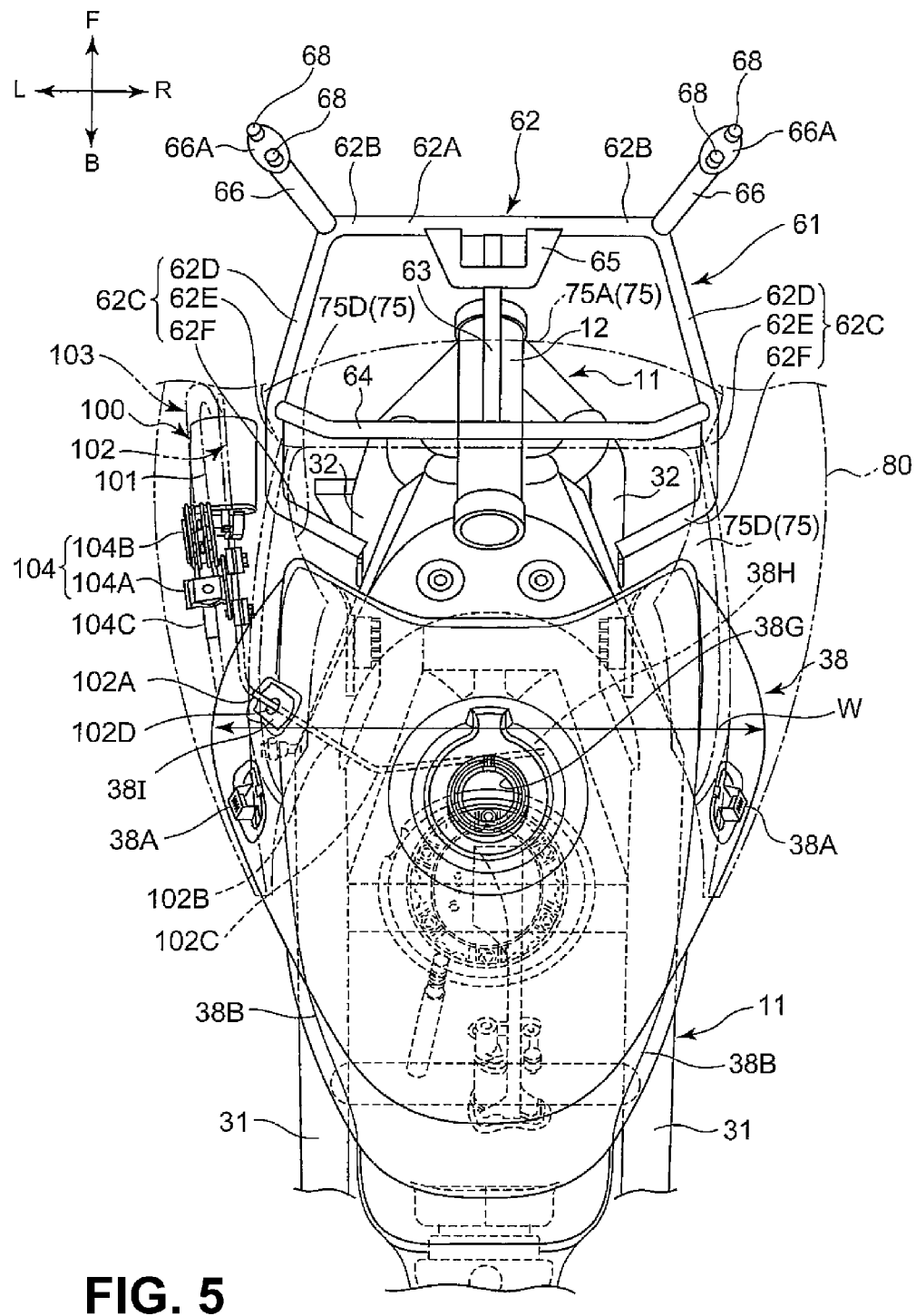

FIG. 5 is a top plan view of the fuel tank 38 supported on the vehicle body frame 11, a cowl stay 61 and the like.

The front cowl 51 is supported by the cowl stay 61, which is supported by (or fixed to) the vehicle frame 11.

The cowl stay 61 has a base stay 62 formed by bending a pipe member. The base stay 62 has a horizontal portion 62A extending in the vehicle width direction (left-right-direction), and slant portions 62C, 62C which are bent at bent portions 62B, 62B at both left and right ends of the horizontal portion 62A and extend rearwards. Of the slant portions 62C, front halves 62D in top plan view shown in FIG. 5 extend rearwards while spreading wider toward the rear side, intermediate portions 62E extend straight rearwards, and rear portions 62F are bent toward the inner side. In the side view shown in FIG. 1, the slant portion 62C as a whole is inclined rearwardly downwards.

As shown in FIG. 5, of the base stay 62, a central part in the left-right direction of the horizontal portion 62A is supported by a fixed stay 63 interposed between itself and the head pipe 12; inner end parts of the rear portions 62F, 62F are connected respectively to the vicinities of the upper ends of the down tubes 32, 32; and, further, parts between the front halves 62D and the intermediate portions 62E of the left and right slant portions 62C, 62C are connected to each other through a reinforcement stay 64 oriented substantially in the left-right direction.

In addition, a roughly U-shaped meter stay 65 for supporting a meter or meters 76 (see FIG. 3) is fixed to a roughly central part in the left-right direction of the horizontal portion 62A. Also, a cowl support stay 66 having a roughly elliptic mount plate 66A at the upper end thereof is extendly provided at each of the bent portions 62B, 62B at the left and right ends of the horizontal portion 62A. The mount plate 66A has two female screws cut therein. Bolts 68 (see FIG. 5) are passed through through-holes bored in a roughly elliptic mounting portion 67A provided at a base end part (lower end part) of each rear-view mirror 67 shown in FIG. 3, and are screw engaged with the female screws formed in the mount plate 66A, whereby the rear-view mirror 67 can be mounted to the cowl support stay 66. In this case, the front cowl 51 is sandwiched between the mount plate 66A on the side of the cowl support stay 66 and the mounting portion 67A on the side of the rear-view mirror 67, whereby the front cowl 51 can be supported on the front end side thereof by the cowl stay 61. On the other hand, the front cowl 51 is mounted, on its rear end side (the side of the rear ends of the front cowls 24, 24 to be described later), to lock portions 38A provided at side surfaces of the fuel tank 38 shown in FIG. 3.

As shown in FIG. 1, the front upper cowl 60 is secured to the vehicle body frame 11 on the front side of the head pipe 12 through the cowl stay 61, and the headlight 70 and a windscreen 71 are disposed there.

The front upper cowl 60 integrally has: a nose portion 72 curved angularly rearwards from the front end of the front upper cowl 60; nose side portions 73, 73 protruding respectively to the left and right sides from the nose portion 72; and air intake duct portions 74, 74 provided on the lower side of the nose portion 72.

The nose portion 72 is provided with a headlight aperture part 72A for accommodating the headlight 70, and is provided on the upper side of the headlight aperture part 72A with an instrument housing 75 as a light shield for the meter(s) 76 accommodated on the rear side of the front upper cowl 60. The windscreen 71 is mounted on the front side of the instrument housing 75.

As shown in FIGS. 3 and 4, the instrument housing 75 has a visor portion 75A for covering the meter(s) 76, and inner front cowl portions 75B, 75B extending rearwards/respectively from left and right end parts of the visor portion 75A. Further, the inner front cowl portion 75B has: a long plate-shaped upper cover part 75C connected to a side surface of the visor portion 75A, extending rearwards substantially horizontally, and connected to the vicinity of a front upper portion of the fuel tank 38; and a roughly triangular inside cover part 75D extending downwards from an inside end edge of the upper cover part 75C.

As shown in FIG. 3, the inside cover part 75D extends in side view from substantially the same position as a front face 101A of the canister 101 rearwards beyond a rear face 101B of the canister 101, to reach a front portion of the fuel tank 38. Thus, the space on the upper and angularly upper rear sides of the canister 101 is covered on the inside thereof by the inside cover part 75D extending in a surface form in the vertical direction and the front-rear direction, and the space on the upper and angularly rear sides of the canister 101 is covered on the upper side thereof by the upper cover part 75C extending in a substantially belt-like form in the front-rear direction.

The inside cover part 75D is provided at front and rear parts of an upper portion thereof with cylindrical mounting portions 75E, 75E extending to the outer side, and the upper end of an upper front cowl portion 80 of the front cowl 24 (to be described later) is mounted to the mounting portions 75E, 75E. The inside cover part 75D faces the upper front cowl portion 80, with a predetermined gap therebetween. Here, the "predetermined gap" means such a gap that the canister 101 to be described later can be accommodated in the gap in the posture of having its longitudinal direction along the front-rear direction.

As shown in FIG. 2, the nose side portions 73 are formed in a left-right symmetrical shape. In side view as shown in FIG. 1, the nose side portion 73 has such a cover shape as to extend rearwards in a roughly V-shaped form with its vertex at a lateral side of the front lower end of the nose portion 72, has a roughly V-shaped section opening toward the inside in front view of the vehicle body (see FIG. 2), and is branched on the rear side to upper and lower parts. An upper side surface 73A of the roughly V-shaped sectional form of the nose side portion 73 extends rearwardly upwards at a comparatively steep inclination along the nose portion 72. A lower side surface 73B of the nose side portion 73 extends rearwardly upwards at an inclination gentler than the inclination of the upper side surface 73A, and, as shown in FIG. 1, is branched from the upper side surface 73A below the handlebar 15, with its upper edge extending substantially horizontally toward the rear side so as not to interfere with the handlebar 15.

As shown in FIG. 2, the air intake duct portions 74 have a left-right pair of ducts located at the front lower end of the front upper cowl 60 and opening toward the front side, and function to introduce a running airflow from the front side of the vehicle body into a space between the left-right pair of front cowls 24, 24.

Now, the front cowls 24, 24 will be described below. As shown in FIG. 2, the front cowls 24 are shaped to be symmetrical with each other on the left and right sides, and, therefore, the front cowl 24 on one side (the left side of the vehicle body) will be described in detail below.

As shown in FIGS. 1 and 2, the front cowl 24 is formed as an integral cover having such a cover shape as to extend rearwards in a roughly V-shaped form with its vertex at an outer slightly lower side of the air intake duct portion 74. Specifically, the front cowl 24 includes the upper front cowl portion 80 extending rearwardly upwards, and a lower front cowl portion 81 extending rearwardly downwards from a front lower portion of the upper front cowl portion 80. Thus, the front cowl 24 is formed as a V-shaped single cover which is branched into upper and lower portions toward the rear side in side view.

In addition, the upper front cowl portion 80 and the lower front cowl portion 81 are formed in curved shapes such as to gradually protrude to the outer sides of the cowl 24 in the vehicle width direction as one goes rearwards from the above-mentioned vertex, are branched into upper and lower portions on the front lateral side of the fuel tank 38, and then extend rearwards. The rear edges of the upper front cowl portion 80 and the lower front cowl portion 81 are cut out in a roughly V-shaped form in side view so as to substantially follow the outline 38C of a dent in each knee grip portion 38B provided as part of the fuel tank 38.

To be more specific, the upper front cowl portion 80 extends rearwards on a lateral side of the fuel tank 38 from an outer slightly lower side of the air intake duct portion 74, so as to cover an area ranging from the front end of the front cowl 51 to the lateral side of the fuel tank 38, and is curved on the lateral side of the fuel tank 38 toward the inner side in the vehicle width direction, to be connected smoothly to a side surface of the fuel tank 38.

As shown in FIG. 2, in front view of the vehicle body, the upper front cowl portion 80 as a whole has a roughly V-shaped sectional form opening toward the inner side, and includes an upper-side slant surface (upper side surface) 80A inclined toward the outer side in the vehicle width direction as one goes toward the lower side of the vehicle body, and a lower-side slant surface (lower side surface) 80B inclined toward the inner side in the vehicle width direction as one goes toward the lower side of the vehicle body. Thus, the upper front cowl portion 80 as a whole forms a swell-shaped protuberant portion protuberant toward the outer side in the vehicle width direction.

Then, a swell-shaped recess 90 is formed on the inside of the upper front cowl portion 80, and the canister 101 to be described later is disposed in the swell-shaped recess 90. As above-mentioned, in this embodiment, the upper front cowl portion 80 as a whole forms a swell-shaped protuberant portion extending outwardly toward the outer side in the vehicle width direction, and its inside surface as a whole corresponds to the swell-shaped recess 90.

As shown in FIG. 1, the upper-side slant surface 80A is formed as a surface extending rearwardly upwards toward the rider seated on the seat 37, so that it can function as a wind guide surface by which a running airflow from the front side of the vehicle body is guided toward the rider, particularly, toward the side of the upper half of the rider's body.

In addition, as shown in FIG. 1, the upper-side slant surface 80A and the lower side surface 73B of the nose side portion 73 form a straightening groove 82 which is V-shaped in side view and which extends in the front-rear direction of the vehicle body, with a joint between the front upper cowl 60 and the front cowl 24 as a boundary. As a result, the running airflow from the front side of the vehicle body can be let flow smoothly toward the rear side of the vehicle body while being straightened by the straightening grooves 82.

As shown in FIG. 1, the lower front cowl portion 81 extends rearwards from an outer slightly lower side of the air intake duct portion 74 so as to cover a lateral side of the space formed between the fuel tank 38 and the engine 17, and covers a lateral side of an upper portion (head cover) of the engine 17 on the front side.

The lower front cowl portion 81 has a slant surface 81A which, in front view of the vehicle body, is inclined substantially toward the inner side in the vehicle width direction as one goes toward the lower side of the vehicle body.

The slant surface 81A extends in the front-rear direction of the vehicle body, and, together with the lower-side slant surface 80B of the upper front cowl portion 80, forms a straightening groove 83 which extends in the front-rear direction of the vehicle body. By the straightening grooves 83 thus formed, the running airflow from the front side of the vehicle body can be let flow rearwards while being straightened into the front-rear direction of the vehicle body. In addition, the straightening groove 83 functions so that the running airflow introduced through the air intake duct portion 74 to the inside of the front cowl 24 is separated to the side of the upper front cowl portion 80 and the side of the lower front cowl portion 81. Of the running airflow thus guided, the air on the upper side is discharged smoothly through the space between the fuel tank 38 and the upper front cowl portion 80, whereas the air on the lower side is guided to the lower side of the fuel tank 38, whereby the cooling performance for the engine 17 can be enhanced, and transmission of heat of the engine 17 to the fuel tank 38 can be cut off effectively.

In addition, since the slant surface 81A is inclined toward the inner side of the vehicle body as one goes toward the lower side of the vehicle body, the running airflow from the front side of the vehicle body can be guided to the lower side of the vehicle body and to the inner side of the vehicle body, to be fed to the engine 17. As a result, the running airflow can be sufficiently supplied to the cooling fins on the engine 17, thereby enhancing the cooling effect. Also, since the running airflow having deprived the engine 17 of the exhaust heat flows on the lower side of the vehicle body, the engine exhaust heat can be prevented from being transferred to the rider.

The motorcycle 10 configured as above has the evaporated fuel treatment device 100.

Figure 6:
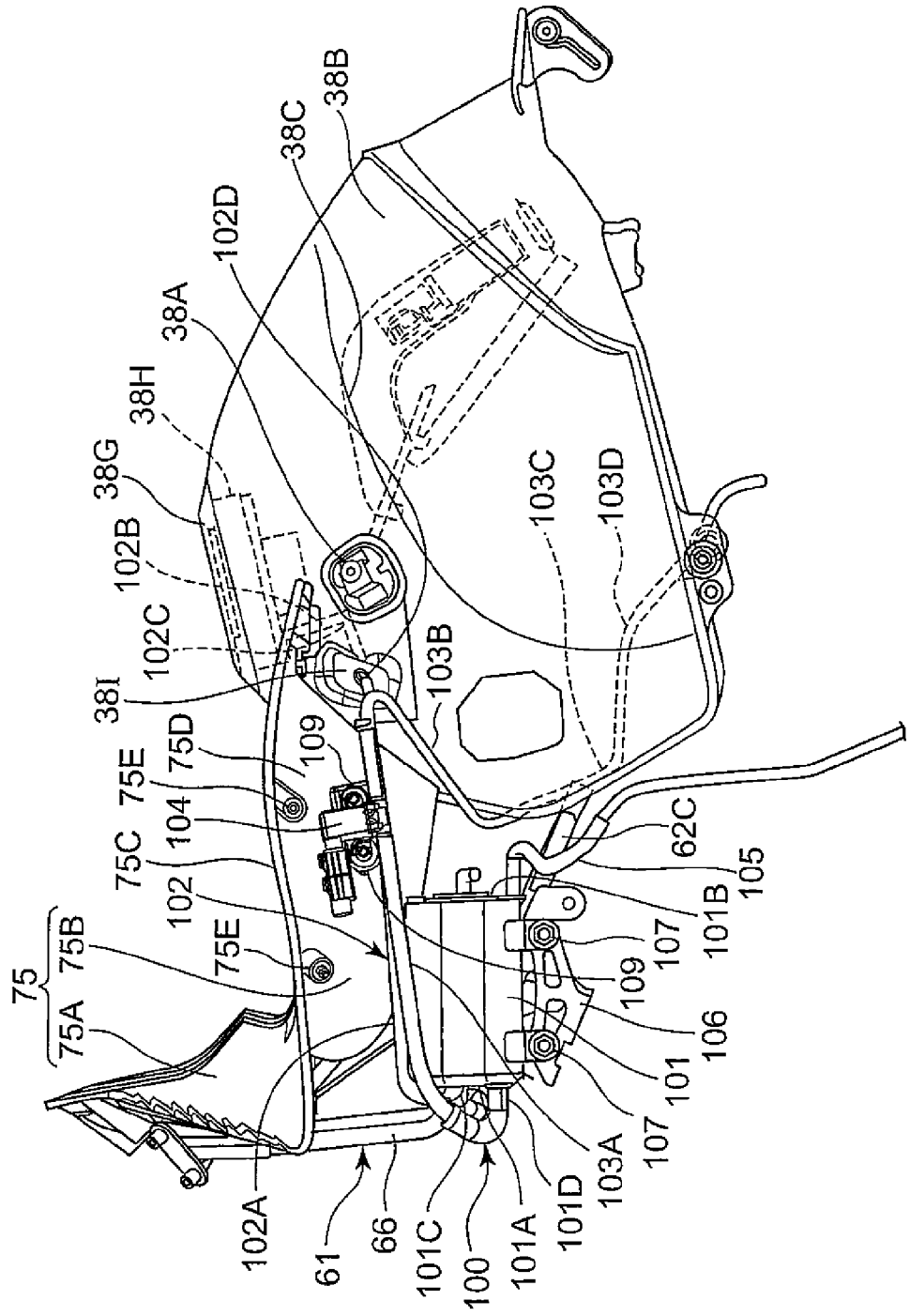
FIG. 6 is a side view of a canister disposed on the front side of the fuel tank.
Figure 7:
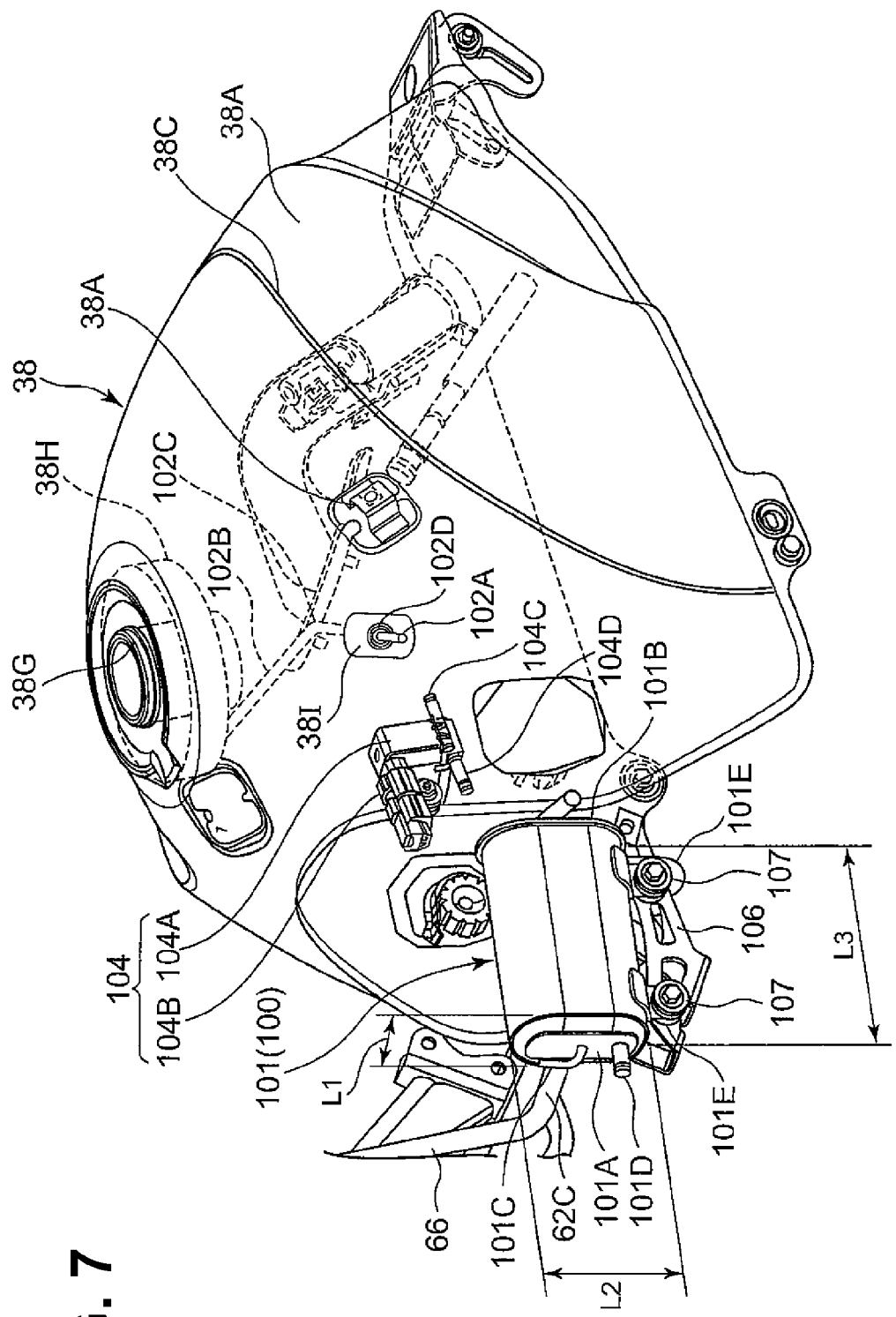
FIG. 7 is a perspective view of the canister.

FIG. 6 is a side view of the canister 101 disposed on the front side of the fuel tank 38, and FIG. 7 is a perspective view of the same.

As shown in FIGS. 2, 6 and 7, the evaporated fuel treatment device 100 has the canister 101 disposed on the left side in the vehicle body, and, as shown in FIG. 6, further has a charging pipe 102 interconnecting the fuel tank 38 on the upstream side and the canister 101, and a purging pipe 103 interconnecting the canister 101 and an intake system of the engine 17 on the downstream side. Here, the "upstream side" and the "downstream side" mean the upstream side and the downstream side along the flowing direction of the evaporated fuel generated in the fuel tank 38; thus, the most upstream side corresponds to the fuel tank 38, the most downstream side corresponds to the intake system of the engine 17, and the canister 101 is intermediately disposed therebetween.

As shown in FIG. 3, in side view, the canister 101 is disposed between the headlight 70 and the fuel tank 38. Simultaneously, as shown in FIG. 2, in front view, the canister 101 is disposed in the swell-shaped recess 90 on the inside of the upper front cowl portion 80 of the front cowl 24.

As shown in FIG. 7, the canister 101 as a whole is formed in a substantially tubular shape having the front face (ceiling face) 101A and the rear face (bottom face) 101B; in front view, the canister 101 is in the shape of an ellipse which is elongated in the vertical direction. The canister 101 is so formed that its vertical size $L2$ is greater than its left-right size $L1$, and its front-rear size $L3$ is greater than its vertical size $L2$. In addition, the canister 101 is so formed that the left-right size $L1$ and the vertical size $L2$ gradually decrease toward the front side. In short, the canister 101 is formed to become slenderer along the forward direction. This shape of the canister 101 corresponds to the shape of that space in the whole interior of the swell-shaped recess 90 on the inside of the upper front cowl portion 80 which is defined between the upper front cowl portion 80 on the side of the front cowl 24 and the inside cover part 75D on the side of the instrument housing 75. In other words, that part of the upper front cowl portion 80 in which the canister 101 is disposed protrudes toward the outer side in the vehicle width direction, the amount of protrusion being increased toward the rear.

An adsorbent such as activated carbon is accommodated inside the canister 101. The evaporated fuel fed from the fuel tank 38 into the canister 101 through the charging pipe 102 to be described later is adsorbed on the adsorbent in the canister 101, and is thereby recovered. The evaporated fuel thus adsorbed on the adsorbent is subsequently released from the adsorbent under a manifold air pressure attendant on the starting of the engine 17, and is supplied through the purging pipe 103 to be described later and through the intake system of the engine 17 into the engine 17, to be combusted.

Here, in the canister 101, evaporation is liable to occur at a higher temperature, whereas adsorption is liable to occur at a lower temperature. Therefore, it is desirable to lower the temperature in the canister 101 at the time of charging, and to raise the temperature at the time of purging. In this embodiment, as will be described later, it is ensured that during parking, external heat arising from direct sunlight and the like is restrained from being transferred to the canister 101, whereby a rise in the temperature is prevented. During running, on the other hand, cooling of the canister 101 by the running airflow is restrained.

On the front face 101A of the canister 101, a charging pipe mounting portion 101C is provided on the upper side, and a purging pipe mounting portion 101D is provided on the lower side. The charging pipe mounting portion 101C is bent toward the upper side, and the downstream end of the charging pipe 102 is connected thereto. On the other hand, the purging pipe mounting portion 101D on the lower side is projected toward the front side, and the upstream end of the purging pipe 103 is connected thereto. In addition, at the lower end of the canister 101, a total of two tongue-shaped mounting portions 101E, 101E, one on the front side and one on the rear side, are provided to project downwards. As shown in FIG. 6, a drain outlet tube 105 is connected to a lower portion of the rear face 101B of the canister 101. Evaporated fuel discharged from the canister 101, and any liquid gasoline having penetrated into the canister 101 is also discharged through the drain outlet tube 105.

As shown in FIG. 7, the canister 101 is fixed in a posture of having its longitudinal axis extending in the front-rear direction of the vehicle by a structure in which the mounting portions 101E, 101E thereof are secured by bolts 107 to a bracket 106 welded to the slant portion 62C of the cowl stay 61.

In this embodiment, as shown in FIG. 1, the canister 101 configured as above is disposed between the headlight 70 and the fuel tank 38 in side view and in the swell-shaped recess 90 on the inside of the front cowl 24, specifically, in the swell-shaped recess 90 on the inside of the upper front cowl portion 80 of the front cowl 24. No other component part than the canister 101 is disposed in the swell-shaped recess 90. Therefore, the canister 101 can be disposed comparatively easily, as compared with the case where the canister 101 is disposed in another place. In other words, the degree of freedom is high as to the shape and position of the canister 101 and as to the layout of the charging pipe 102 and the purging pipe 103 which will be described later, as well as a piping for the purge control valve 104, and so on.

Figure 8:
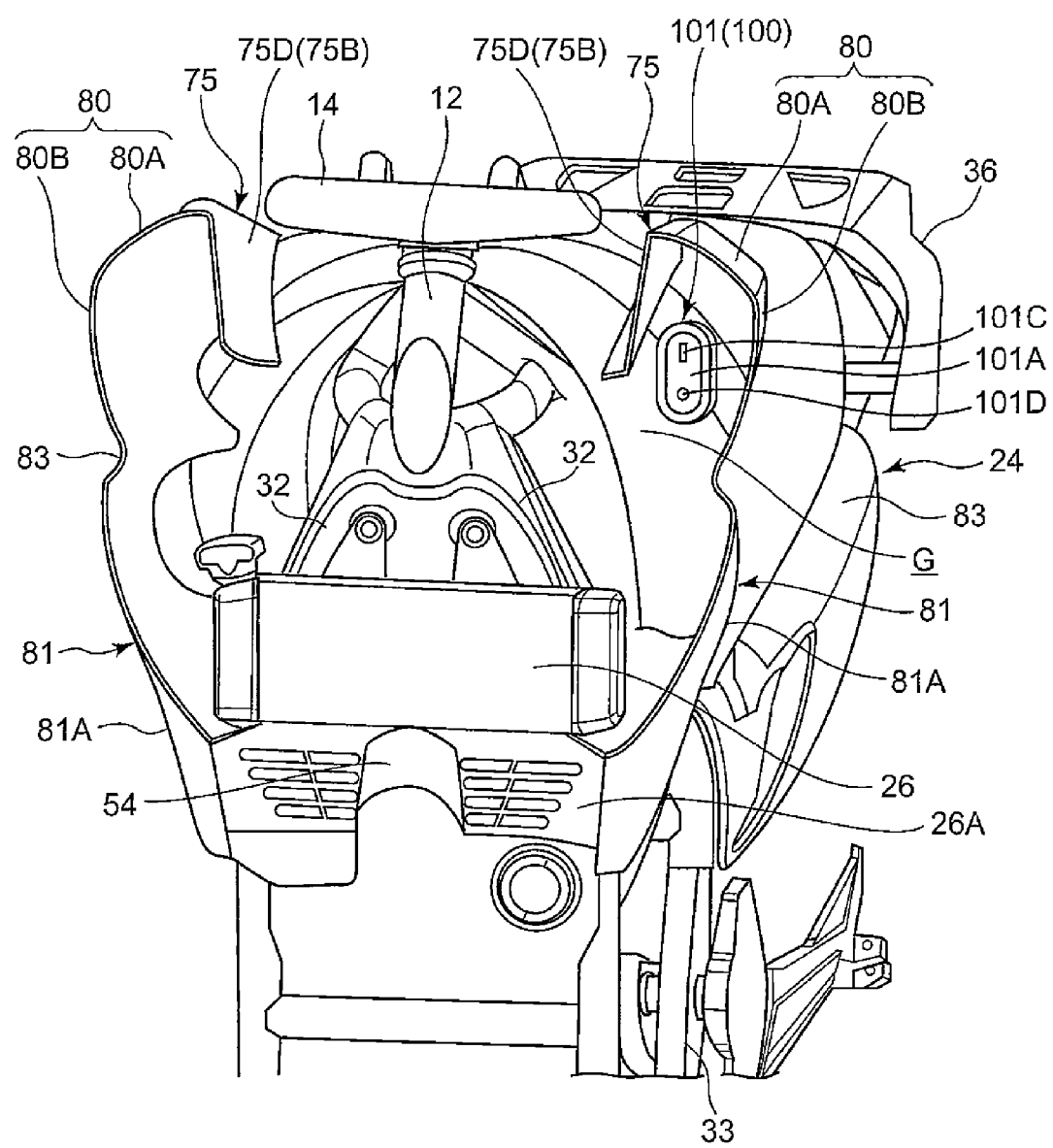
FIG. 8 illustrates a shielding structure for the canister.

FIG. 8 shows a shielding structure for the canister 101. As shown in the figure, of the canister 101, the outer side (the left side of the canister 101) is covered by the upper front cowl portion 80 of the front cowl 24, the angular inner upper side is covered by the inside cover part 75D of the instrument housing 75, and the upper side is covered by the upper cover part 75C of the instrument housing 75 and the front cowl 24. In addition, the front side and the rear side of the canister 101 are also covered by the upper front cowl portion 80 of the front cowl 24, and the canister 101 as a whole is accommodated in the swell-shaped recess 90 on the inside of the front cowl 24 (specifically, on the inside of the upper front cowl portion 80).

Therefore, direct sunlight coming from the left, right and upper sides, etc. of the vehicle body (inclusive of sunlight reflected on the ground) can be intercepted by the front cowl 24 and the instrument housing 75. Furthermore, since the front cowl 24 has the lower front cowl portion 81 extending downwards on the outer side of the canister 101 (on the left side of the canister 101), transfer of radiant heat from the road surface to the canister 101 is restrained.

Thus, the peripheral portions of the canister 101 are covered by the front cowl 24 and the instrument housing 75, so that the influence of external heat can be lessened. For instance, the charging performance of the canister 101 is higher as temperature is lower. Therefore, if the motorcycle 10 is parked outdoors in the condition where the canister 101 is not covered, direct sunlight would be incident on the canister 101 to raise the temperature in the canister 101, thereby lowering the charging performance. In this embodiment, incidence of direct sunlight on the canister 101 can be prevented by the front cowl 24, so that a lowering in the charging performance due to direct sunlight can be substantially prevented from occurring.

Also, as shown in FIG. 8, on the lower side of the canister 101, the radiator 26 is disposed on the right side in the vehicle body, and a reservoir tank 28 (see FIGS. 3 and 4) therefor is disposed on the left side in the vehicle body. Specifically, on the lower side of the canister 101, the radiator 26 and the reservoir tank 28 are disposed at substantially the same position, with respect to the front-rear direction and the vertical direction. Incidentally, in FIG. 8, a radiator cover 26A for covering the front side of the radiator 26 is partly omitted.

Here, as shown in FIG. 8, the space between the front cowl 24 and the instrument housing 75 is opening on the lower side, so that the heat radiated from the radiator 26 during running enters the space around the canister 101 through this opening (a gap G shown in FIG. 8). As a result, the canister 101 is warmed during running of the vehicle, whereby the purging performance of the canister 101 can be enhanced.

Thus, in this configuration, the front cowl 24 and the instrument housing 75 cover the canister 101 on the upper side of the canister 101 and are opening to the lower side. Consequently, direct sunlight can be intercepted, to thereby earn the charging amount, and the heat from the radiator 26 during running can be led to the canister 101, to thereby promote the purging performance during running of the vehicle.

In addition, if the running airflow impinges on the canister 101, the temperature in the canister 101 would be lowered and the purging performance would be thereby lowered. In this embodiment, however, the canister 101 is covered by the front cowl 24 at least on the lateral sides and on the front side, as shown in FIGS. 1, 2 and 8. Therefore, the running airflow can be prevented from coming into direct contact with the canister 101, whereby the purging performance of the canister 101 can be prevented from being lowered due to the running airflow. Incidentally, the running airflow having passed through the area of the radiator 26 flows smoothly to the rear side of the radiator 26, without flowing toward the canister 101, so that the purging performance is prevented from being lowered due to the running airflow.

Also, as shown in FIG. 2, since the canister 101 is covered on its outside by the front cowl 24, when an external force is exerted from the left side of the vehicle body, the external force does not act directly on the canister 101. Particularly, the front cowl 24 in this configuration is formed to be V-shaped in side view by the arrangement of the upper front cowl portion 80 and the lower front cowl portion 81. Therefore, the front cowl 24 is substantially V-shaped in section as well, so that the cowl rigidity is high, and the heat from the radiator 26 during running and the exhaust heat from the operating engine 17 during when the vehicle is at a stop are liable to be accumulated in the inside of the upper front cowl portion 80. Accordingly, by disposing the canister 101 on the inside of the upper front cowl portion 80, it is possible to warm the canister 101 efficiently while appropriately covering the canister 101.

Furthermore, where the canister 101 is disposed on the inner side in the vehicle width direction relative to the plane H on which the grounding point 16A of the front wheel 16 and a handlebar end portion 15A are located, when for example an external force is exerted on a plane basis from the left side of the vehicle body, the external force would act rather on the grounding point 16A of the front wheel 16 and the handlebar end portion 15A than on the canister 101.

In addition, since the front cowls 24, 24 are formed to be substantially symmetrical with each other on the left and right sides, a swell-shaped recess 90 equivalent to the above-mentioned swell-shaped recess 90 is formed also on the inside of the front cowl 24 on the right side, so that the canister 101 can also be disposed in the swell-shaped recess 90 on the right side. However, it is preferable to dispose the canister 101 in the swell-shaped recess 90 formed by the front cowl 24 on the left side. The reason is as follows. When the motorcycle 10 is for example parked outdoors by use of the side stand 41 without using the main stand 40 shown in FIG. 1, the vehicle body is inclined to the left side on which the side stand 41 exists. In general, therefore, it is considered that the front cowl 24 on the left side is less liable to be exposed to direct sunlight than the front cowl 24 on the right side. Therefore, when the canister 101 is disposed in the swell-shaped recess 90 on the left side, a rise in the temperature in the canister 101 and a lowering in the charging performance of the canister 101 can be restrained more securely, as compared with the case where the canister 101 is disposed in the swell-shaped recess 90 on the right side.

Also, when the layout position of the canister 101 is set outside the turning range of the front forks 13, 13, interference of the canister 101 with the front forks 13, 13 upon a steering operation of the handlebar 15 can be obviated. In addition, the layout position of the canister 101 can be deviated from a position directly above the engine 17 and set on the front side, the influence of the heat of the engine 17 on the canister 101 can be lessened.

As shown in FIG. 6, of the charging pipe 102, a downstream-side portion 102A is disposed on the outside of the fuel tank 38, whereas an upstream-side portion 102B is disposed on the inside of the fuel tank 38, and a penetrating portion 102D between the downstream-side portion 102A and the upstream-side portion 102B is let penetrate a side surface of the fuel tank 38. An annular gas-liquid separator 38H is provided in a gaseous phase in an upper portion of the inside of the fuel tank 38, specifically, directly under an oil feed opening 38G at the top of the fuel tank 38, for separation between the liquid fuel contained in the fuel tank 38 and the gaseous or evaporated fuel generated from the liquid fuel. The upstream end of the upstream-side portion 102B of the charging pipe 102 is disposed at the gas-liquid separator 38H. As shown in FIG. 5, the upstream-side portion 102B of the charging pipe 102 is provided at its intermediate part with a bent part 102C which is bent at an obtuse angle.

Figure 9:
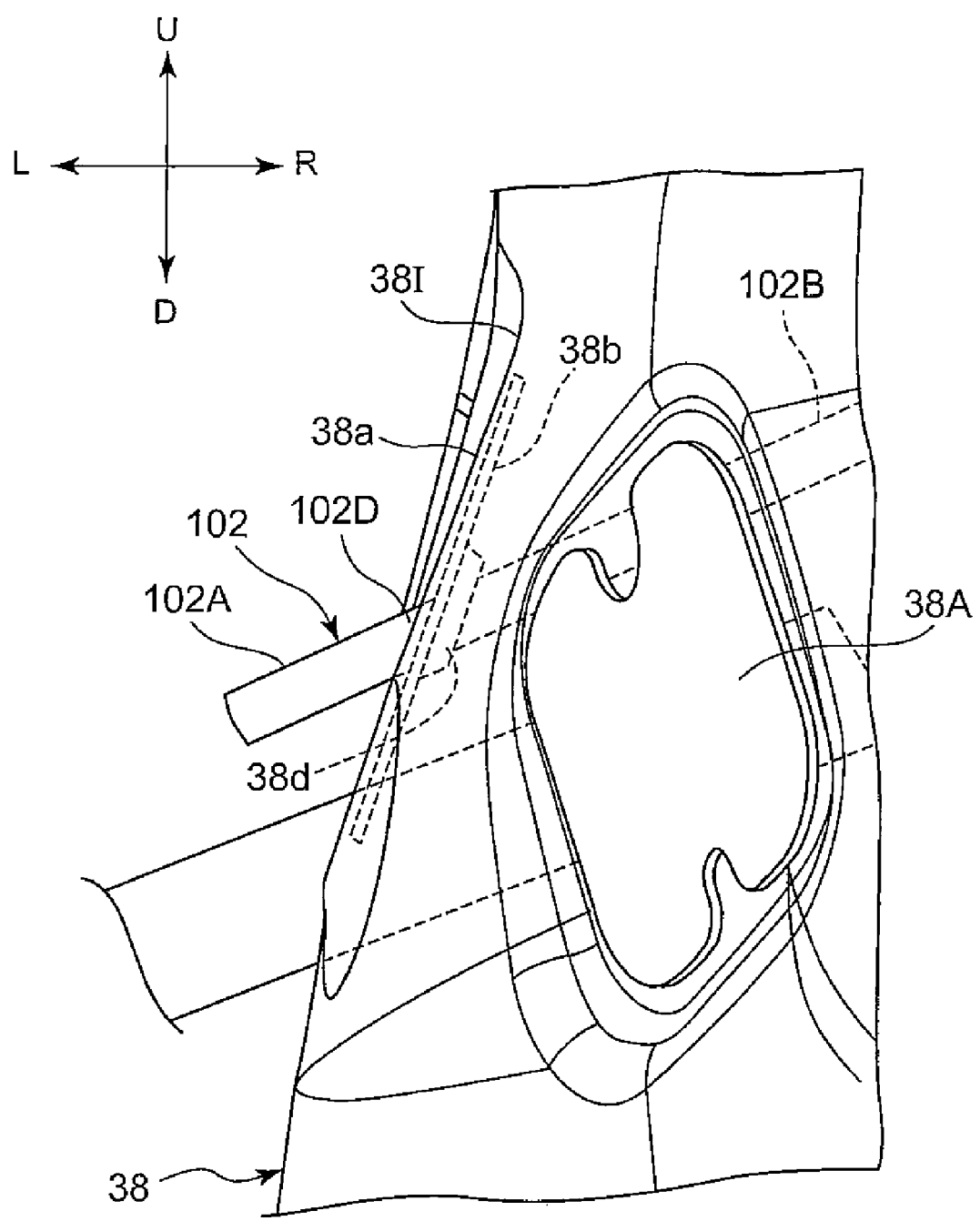
FIG. 9 is a view, from the rear side, of a charging pipe penetration part.
Figure 10A:
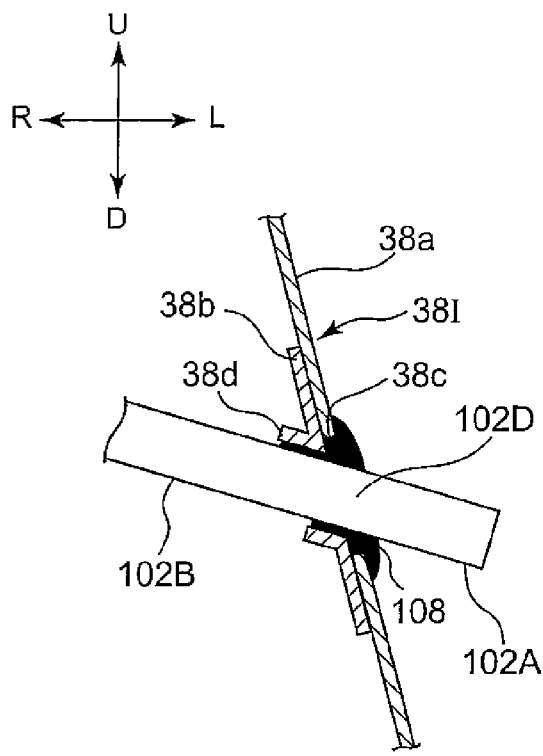
FIG. 10(A) is a vertical sectional view taken by cutting the charging pipe penetration part along a plane substantially orthogonal to the front-rear direction and viewing the section from the front side.

FIG. 9 is a view, from the rear side, of a charging pipe penetration part 38I, namely, that part of the fuel tank 38 which is penetrated by the charging pipe 102. FIG. 10(A) is a vertical sectional view taken by cutting the charging pipe penetration part 38I along a plane substantially orthogonal to the front-rear direction and viewing the section from the front side.

As shown in FIGS. 5, 6 and 9, the charging pipe penetration part 38I is formed in a roughly rectangular recessed shape, and the charging pipe 102 angularly penetrates the charging pipe penetration part 38I, namely, at a predetermined angle against the tank surface. As shown in FIG. 10(A), a reinforcement plate 38b is spot welded to that portion of the inside surface of the fuel tank 38 which corresponds to the charging pipe penetration part 38I. At that portion of the reinforcement plate 38b which corresponds to the penetrating portion 102D of the charging pipe 102, a boss portion 38d inclined in conformity with the inclination angle of the charging pipe 102 is provided to project inwards. On the other hand, a wall portion (tank wall) 38a of the charging pipe penetration part 38I is formed with an inclined through-hole 38c which has an inside diameter greater than the outside diameter of the charging pipe 102.

In performing assembly, after the charging pipe 102 is inserted into the boss portion 38d, the periphery of that part of the wall portion 38a which surrounds the through-hole 38c, namely, a base portion of that part of the charging pipe 102 which is protruding to the outside is welded along the whole circumference thereof, to form a weld part 108. In addition, a condition of (outside diameter of charging pipe 102)<(bore diameter (inside diameter) of boss portion 38d of reinforcement plate 38b)<(bore diameter of wall portion (tank wall) 38a) is established. Therefore, it is easy to achieve position matching between the reinforcement plate 38b and the wall portion (tank wall) 38a. In addition, it is easy to pass the charging pipe 102 through the relevant part. Furthermore, the above-mentioned three members (the charging pipe 102, the reinforcement plate 38b, and the wall portion (tank wall) 38a) can be brazed collectively.

Specifically, the charging pipe penetration part 38I is formed by a method in which the fuel tank 38 is provided in its side wall (wall portion 38a) with the through-hole 38c having a diameter greater than the outside diameter of the charging pipe 102, the reinforcement plate 38b having a boss hole (boss portion 38d) which extends slantingly along the inclination of the charging pipe 102 to communicate with the through-hole 38c and which has a diameter greater than the outside diameter of the through-hole 38c is joined to the periphery of the through-hole 38c, the charging pipe 102 is passed through the through-hole 38c and the boss hole (boss portion 38d), and these members are brazed collectively. Consequently, it is possible to secure rigidity of the charging pipe penetration part 38I. Also, it is possible to perform such a control that the gap in the periphery of the charging pipe 102 is closed easily and assuredly by the collective brazing, so that gas-tightness can be secured there.

Figure 10B:
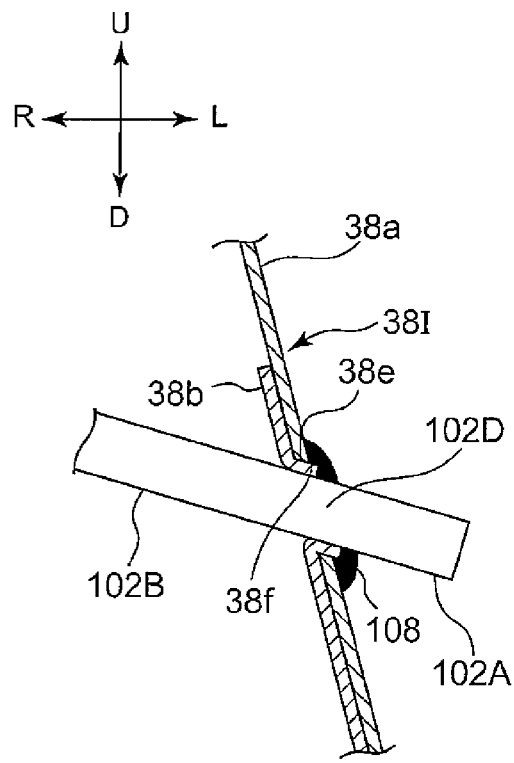
FIG. 10(B) illustrates a modification of the charging pipe penetration part.

Here, FIG. 10(B) shows a modification of FIG. 10(A). In this modification, of the reinforcement plate 38b, a boss portion 38f which is inclined and in which to insert the charging pipe 102 is formed to project outwards, reversely to the example shown in FIG. 10(A). The wall portion (tank wall) 38a is formed with a through-hole 38e having an inside diameter approximately equal to the outside diameter of the boss portion 38f, and the boss portion 38f is passed through the through-hole 38e. After the charging pipe 102 is passed through the boss portion 38f, the tip of the boss portion 38f and the outer periphery of the charging pipe 102 are welded to each other, to form a weld part 108. In this modification, also, the same effect as that in the example shown in FIG. 10(A) can be obtained. Namely, at the time of assembly, it is easy to pass the charging pipe 102 through the through-hole 38e, and enhanced ease of assembly is secured.

In addition, since the charging pipe 102 angularly penetrates the charging pipe penetration part 38I provided in the side wall of the fuel tank 38, the amount of substantial protrusion of the charging pipe 102 from the side wall of the fuel tank 38 can be reduced by an amount according to the inclination. In this connection, where the charging pipe 102 is penetrating the side wall of the fuel tank 38 with an inclination angle, upon exertion of an external force in the same direction as above-mentioned on the charging pipe 102, the charging pipe 102 is deformed in such a direction as to enlarge the inclination angle against the orthogonal direction, so that the charging pipe penetration part 38I can be protected.

Also, since the charging pipe 102 has the bent portion 102C at a part of its upstream-side portion 102B located on the inside of the fuel tank 38 as described above, upon exertion of an external force on the fuel tank 38, part of the external force is absorbed in the bent portion 102C, whereby external forces acting on the charging pipe penetration part 38I and on a joint to the gas-liquid separator 38H can be reduced.

Further, as shown in FIG. 5, the charging pipe penetration part 38I of the fuel tank 38 is located on the vehicle body inner side relative to a outermost protruding portion W of the side wall of the fuel tank 38. This ensures that when an external force is exerted on the fuel tank 38 from a lateral side of the vehicle body, the external force first acts on the outermost protruding portion W, so that the external force is unlikely to act directly on the charging pipe penetration part 38I.

In addition, as shown in FIG. 6, the charging pipe penetration part 38I is provided at the side surface of the fuel tank 38 on the upper side relative to the knee grip portion 38B (to be gripped by the rider's knee) of the fuel tank 38. This makes it possible to preclude the influences on the charging pipe penetration part 38I which might arise from contact between the charging pipe 102 and the rider's leg or foot, or the like.

Also, as shown in FIG. 1, the charging pipe penetration part 38I is covered by the front cowl 24 for covering a lateral side of the vehicle body, and is provided in the vicinity of the lock portion 38A, which is a front cowl mounting portion. Therefore, the charging pipe penetration part 38I is located in an area where the cowl is supported rigidly, so that it is possible to protect the charging pipe penetration part 38I. Also, it is possible to make the charging pipe penetration part 38I invisible on an appearance basis, so that enhanced appearance can be obtained.

Further, where the charging pipe penetration part 38I is disposed on the inner side in the vehicle width direction relative to the above-mentioned plane H shown in FIG. 2, namely, the plane H on which the grounding point 16A of the front wheel 16 and the handlebar end portion 15A are located, it is ensured that when an external force is about to be exerted on a plane basis from the left side of the vehicle body, the external force will act on the handlebar end portion 15A and the grounding point 16A of the front wheel 16, before acting on the charging pipe penetration part 38I. Therefore, the external force is unlikely to act on the charging pipe penetration part 38I, or, even if the external force should act on the charging pipe penetration part 38I, the intensity of the acting force would be reduced.

As has been mentioned above, of the charging pipe 102, the upstream end is disposed at the gas-liquid separator 38H disposed in the gaseous phase in the upper portion of the inside of the fuel tank 38, the penetrating portion 102D as an intermediate portion is disposed at the charging pipe penetration part 38I, and the downstream end is connected to the charging pipe mounting portion 101C located on the upper side in the front face 101A of the canister 101. Here, the gas-liquid separator 38H, the charging pipe penetration part 38I, and the charging pipe mounting portion 101C are so arranged that they are gradually lowered in height in this order. Consequently, the charging pipe 102 as a whole is so laid that the most upstream portion is the highest, the piping is gradually lowered in height along the downstream direction, and the most downstream portion is the lowest. Since the charging pipe 102 is thus laid so that it is lowered in height along the downstream direction, the evaporated fuel which migrates in the charging pipe 102 and which is heavier than air flows smoothly along this inclination of the charging pipe 102 from the gas-liquid separator 38H on the upstream side toward the charging pipe mounting portion 101C on the downstream side.

In addition, since the charging pipe 102 is led out to the exterior by penetrating the side wall of the fuel tank 38, the need to take into account the positional relationships of the charging pipe 102 with the rider or other component parts on the lower side of the fuel tank 38 is eliminated and, hence, the degree of freedom in layout is enhanced, as compared with the case where the charging pipe 102 is led out through the upper side or the lower side of the fuel tank 38.

As shown in FIG. 6, the purging pipe 103 is connected at its upstream end to the purging pipe mounting portion 101D on the lower side in the front face 101A of the canister 101, is let rise angularly rearwardly upwards, and extends substantially along the charging pipe 102 toward the charging pipe penetration part 38I of the fuel tank 38 (rearwardly ascending portion 103A). Then, the purging pipe 103 is bent, extends angularly forwardly downward (forwardly descending portion 103B), enters the back side of a bifurcated portion of the fuel tank 38, and extends angularly rearwardly downwards (steep slant portion 103C). Thereafter, the purging pipe 103 is bent, extends angularly rearwardly further downwards (gentle slant portion 103D), further extends angularly rearwardly downwards at a somewhat steeper inclination, and is connected to the intake system of the engine 17.

Thus, of the purging pipe 103, the rearwardly ascending portion 103A ranging from the upstream end connected to the purging pipe mounting portion 101D on the front face 101A of the canister 101 to the vicinity of the charging pipe penetration part 38I is so disposed as to be raised in height along the downstream direction, whereby the fuel converted into liquid in the canister 101 is prevented from leaking to the outside through the purging pipe 103. The charging pipe 102 and the purging pipe 103 as above are mounted to clamps (not shown) which are integrally provided on the inside surface of the upper front cowl portion 80 of the front cowl 24 or on the outside surface of the inside cover part 75D of the upper front cowl portion 80 of the instrument housing 75. This eliminates the need to provide clamps for exclusive use, whereby the number of component parts can be reduced.

The charging pipe 102 and the purging pipe 103 as above are composed of steel pipes. It is to be noted here, however, that flexible fuel-resistant plastic tubes can also be used as these pipes.

As shown in FIG. 6, the purge control valve 104 is provided at the rearwardly ascending portion of the purging pipe 103. The purge control valve 104 has a valve main body 104A for opening/closing the flow passage inside the purging pipe 103, and a control unit 104B for controlling the valve main body 104A. At a lower portion of the valve main body 104A, joint portions 104D and 104C for joint with the purging pipe 103 are provided to project toward the front side and the rear side, respectively. The control unit 104B applies an on/off duty control to the valve main body 104A, thereby controlling the quantity of the evaporated fuel fed through the purging pipe 103 to the intake system of the engine 17.

As shown in FIG. 6, the purge control valve 104 is mounted to the inside cover part 75D on the side of the instrument housing 75 by screws 107. This makes it possible to omit a stay for mounting the purge control valve 104, and thereby to reduce the number of component parts. Alternatively, if desired, the purge control valve 104 may be mounted to the inside surface of the upper front cowl portion 80 on the side of the front cowl 24, instead of being mounted to the inside cover part 75D.

Figure 11:
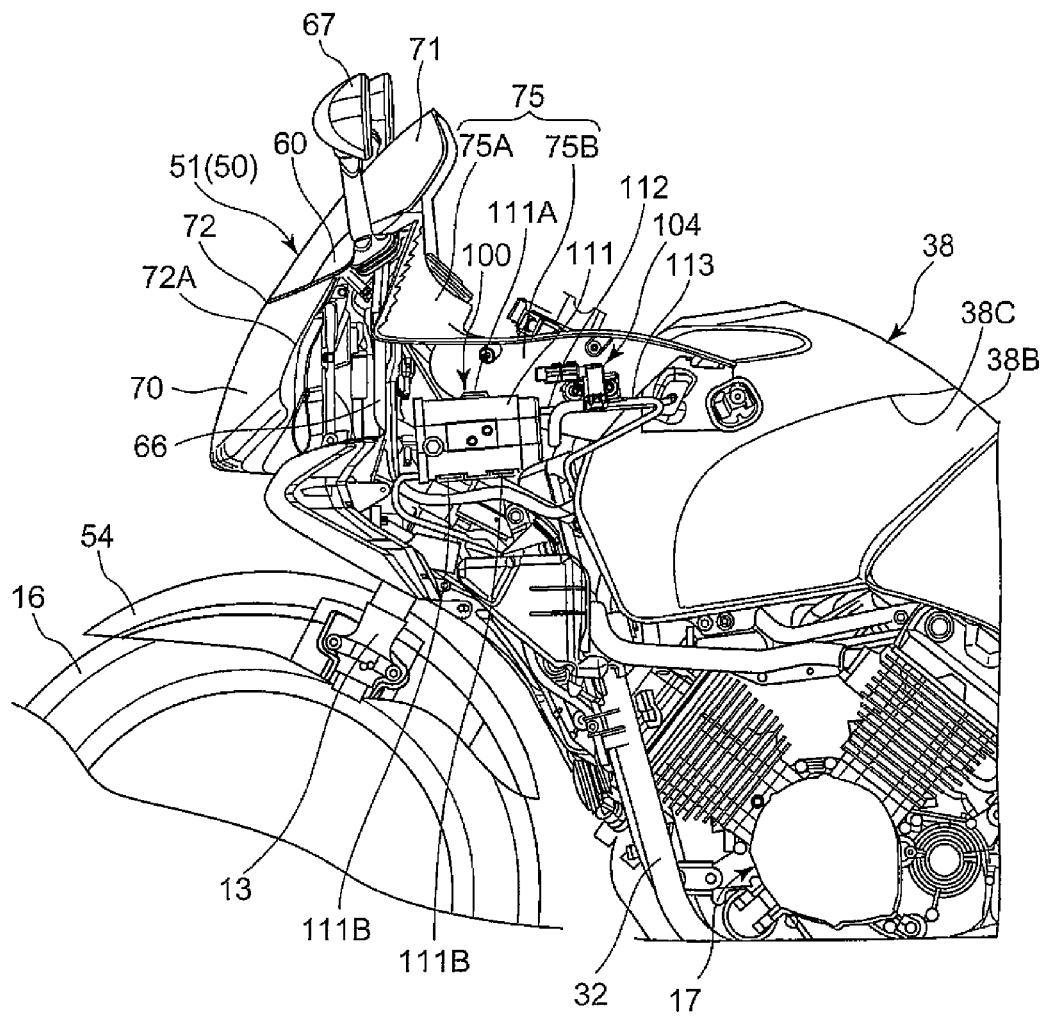
FIG. 11 is an enlarged left side view of a vehicle body front portion in the condition where the front cowl is removed, for illustrating another example of mounting a canister.
Figure 12:
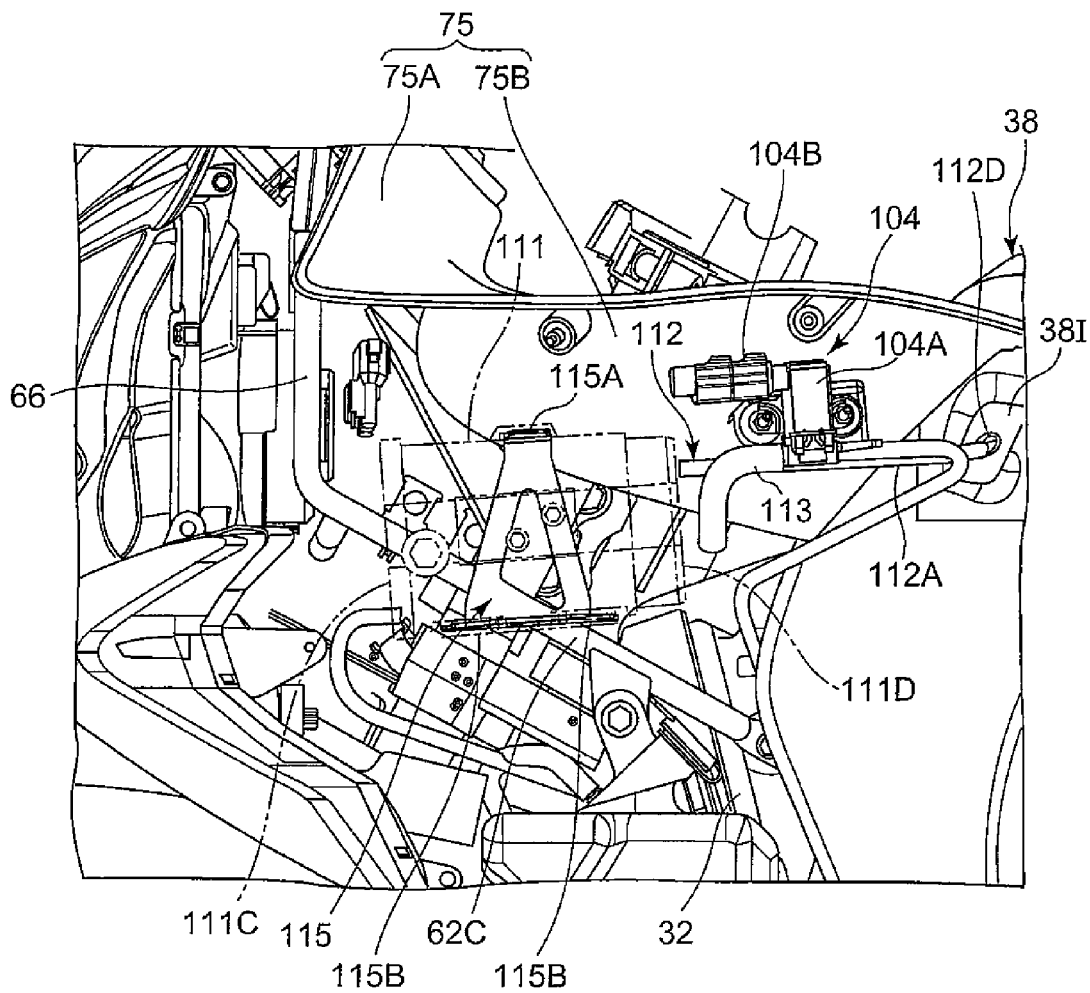
FIG. 12 is a view of the vehicle body front portion in the condition where the canister is further removed from the condition shown in FIG. 11.

FIGS. 11 and 12 illustrate another example of mounting a canister 111. Here, FIG. 11 is a view corresponding to FIG. 3, specifically, an enlarged left side view of a vehicle body front portion in the condition where the front cowl 24 is removed, and FIG. 12 is an enlarged left side view of the vehicle body front portion in the condition where the canister is further removed from the condition shown in FIG. 11. As shown in FIG. 12, a mounting member 115 roughly triangular in side view is fixed to the slant portion 62C of the cowl stay 61 by, for example, welding. The mounting member 115 is formed with plate-like mounting portions 115A, 115B, 115B, one at the upper end thereof and two at the lower end thereof. These mounting portions 115A, 115B, 115B are inserted into receiving portions 111A, 111B, 111B provided on the side of the canister 111, whereby the canister 111 is fixed. Incidentally, in the example shown in FIGS. 11 and 12, the charging pipe 112 and the purging pipe 113 are connected to the side of a rear face 111D of the canister 111. Incidentally, symbols 112A and 112D in FIG. 12 respectively denote a downstream-side portion and a penetrating portion of the charging pipe 112.

As shown in FIGS. 11 and 12, the canister 111 is disposed on the front side relative to the charging pipe penetration part 38I of the fuel tank 38 and the intake system of the engine 17. Therefore, where the charging pipe 112 and the purging pipe 113 are connected not to the front face 111C of the canister 111 but to the rear face 111D of the canister 111, the piping lengths of the charging pipe 112 and the purging pipe 113 can be shortened and, hence, the configuration can be simplified, as compared with the case where these pipes are connected to the front face 111C.

The above-described embodiments are merely exemplary modes for carrying out the present invention, and arbitrary modifications and applications are possible within the scope of the invention. For instance, while the canister 101 is covered by the front cowl 24 on the front and rear sides thereof in the above-described embodiments, the canister 101 may be covered by the instrument housing 75 on the front and rear sides thereof by, for example, bending the inside cover part 75D of the instrument housing 75. What is important lies in that the canister 101 is covered by at least one of the front cowl 24 and the instrument housing 75.

Although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

What is claimed is:

1. In a motorcycle comprising
a vehicle body frame,
a fuel tank and a headlight which are disposed on the vehicle body frame,
and a front cowl which covers a front portion of the vehicle body frame and comprises a swell-shaped protuberant portion defining a swell-shaped recess formed therein and extending in a vehicle width direction,
the improvement comprising an evaporated fuel treatment device comprising a canister for receiving an evaporated fuel coming from the fuel tank, said canister disposed in the swell-shaped recess on the inside of the front cowl, situated between the headlight and the fuel tank, as seen in side view.

2. The evaporated fuel treatment device according to claim 1, wherein the canister is disposed in a space surrounded by the front cowl and an instrument housing, which covers a meter and extends toward the inside of the front cowl.

3. The evaporated fuel treatment device according to claim 2, wherein the canister is accommodated in the swell-shaped recess and is covered by at least one of the instrument housing and the front cowl on the front and rear sides thereof.

4. The evaporated fuel treatment device according to claim 2, wherein the canister is supported by a cowl stay, which is mounted to the vehicle body frame and which supports the front cowl.

5. The evaporated fuel treatment device according to claim 2, further comprising:
a charging pipe interconnecting the fuel tank and the canister;
a purging pipe interconnecting the canister and an intake system component of an internal combustion engine; and
a purge control valve which is provided at an intermediate portion of the purging pipe and performs a duty control so as to control a quantity of the evaporated fuel sent to the internal combustion engine,
wherein the charging pipe and the purging pipe are each supported by a respective clamp provided on the front cowl or the instrument housing; and
wherein the purge control valve is mounted to the front cowl or to the instrument housing.

6. The evaporated fuel treatment device according to claim 5, wherein the charging pipe penetrates a side surface of the fuel tank and extends from the inside to the outside of the fuel tank, and an area of the penetration is covered by the front cowl.

7. The evaporated fuel treatment device according to claim 5, wherein the instrument housing and the front cowl cover the canister on the upper side thereof, and are opened to the lower side.

8. The evaporated fuel treatment device according to claim 1, wherein the canister is disposed on the inner side, in the vehicle width direction, relative to a plane on which a grounding point of a front wheel and an end portion of a handlebar are located.

9. The evaporated fuel treatment device according to claim 1, wherein the front cowl has a V-shaped edge portion, including an upper front cowl portion extending rearwardly and a lower front cowl portion extending rearwardly and downwardly from a front lower portion of the upper front cowl portion,
and wherein the canister is disposed on the inside of the upper front cowl portion.

10. A motorcycle comprising
a vehicle body frame,
a fuel tank and a headlight which are disposed on the vehicle body frame,
and a front cowl which covers a front portion of the vehicle body frame and has a swell-shaped protuberant portion formed therein and defining a swell-shaped recess therein extending in a vehicle width direction,
an evaporated fuel treatment device comprising a canister for receiving an evaporated fuel coming from the fuel tank, said canister disposed in the swell-shaped recess inside of the front cowl, situated between the headlight and the fuel tank, as seen in side view, a charging pipe interconnecting the fuel tank and the canister;

a purging pipe interconnecting the canister and an intake system component of an internal combustion engine; and a purge control valve which is provided at an intermediate portion of the purging pipe and performs a duty control so as to control a quantity of the evaporated fuel sent to the internal combustion engine, wherein the canister is disposed in a space surrounded by the front cowl and an instrument housing, which covers a meter and extends toward the inside of the front cowl, wherein the charging pipe and the purging pipe are each supported by a respective clamp provided on the front cowl or the instrument housing;

and wherein the purge control valve is mounted to the front cowl or the instrument housing.

11. The evaporated fuel treatment device according to claim 10, wherein the charging pipe penetrates a side surface of the fuel tank and extends from the inside to the outside of the fuel tank, and an area of the penetration is covered by the front cowl.

12. The evaporated fuel treatment device according to claim 10, wherein the instrument housing and the front cowl cover the canister on the upper side thereof, and are opened to the lower side.

13. The evaporated fuel treatment device according to claim 10, wherein the canister is disposed on the inner side, in the vehicle width direction, relative to a plane on which a grounding point of a front wheel and an end portion of a handlebar are located.

14. The evaporated fuel treatment device according to claim 10, wherein the front cowl has a V-shaped edge portion, including an upper front cowl portion extending rearwardly and a lower front cowl portion extending rearwardly and downwardly from a front lower portion of the upper front cowl portion, and wherein the canister is disposed on the inside of the upper front cowl portion.

15. The evaporated fuel treatment device according to claim 10, wherein the canister is accommodated in the swell-shaped recess and is covered by at least one of the instrument housing and the front cowl on the front and rear sides thereof.

16. The evaporated fuel treatment device according to claim 10, wherein the canister is supported by a cowl stay which is mounted to the vehicle body frame and which supports the front cowl.

17. The evaporated fuel treatment device according to claim 3, wherein the canister is supported by a cowl stay, which is mounted to the vehicle body frame and which supports the front cowl.

18. The evaporated fuel treatment device according to claim 3, further comprising:

a charging pipe interconnecting the fuel tank and the canister;

a purging pipe interconnecting the canister and an intake system component of an internal combustion engine; and a purge control valve which is provided at an intermediate portion of the purging pipe and performs a duty control so as to control a quantity of the evaporated fuel sent to the internal combustion engine, wherein the charging pipe and the purging pipe are each supported by a respective clamp provided on the front cowl or the instrument housing; and wherein the purge control valve is mounted to the front cowl or to the instrument housing.

19. The evaporated fuel treatment device according to claim 4, further comprising:

a charging pipe interconnecting the fuel tank and the canister;

a purging pipe interconnecting the canister and an intake system component of an internal combustion engine; and a purge control valve which is provided at an intermediate portion of the purging pipe and performs a duty control so as to control a quantity of the evaporated fuel sent to the internal combustion engine, wherein the charging pipe and the purging pipe are each supported by a respective clamp provided on the front cowl or the instrument housing; and wherein the purge control valve is mounted to the front cowl or to the instrument housing.

* * * * *